US008383010B2

(12) United States Patent
Liiv

(10) Patent No.: US 8,383,010 B2
(45) Date of Patent: Feb. 26, 2013

(54) ACTIVE OPTICAL ELEMENT, METHOD OF PRODUCING THE SAME

(75) Inventor: Jüri Liiv, Kuusalu (EE)

(73) Assignee: Visitret Displays Ou, Tallinn (EE)

(*) Notice: Subject to any disclaimer, the term of this patent is extended or adjusted under 35 U.S.C. 154(b) by 38 days.

(21) Appl. No.: 12/440,573

(22) PCT Filed: Sep. 7, 2007

(86) PCT No.: PCT/EE2007/000016
§ 371 (c)(1),
(2), (4) Date: Apr. 17, 2009

(87) PCT Pub. No.: WO2008/028495
PCT Pub. Date: Mar. 13, 2008

(65) Prior Publication Data
US 2010/0038600 A1  Feb. 18, 2010

(30) Foreign Application Priority Data
Sep. 8, 2006 (EE) .................................. 200600031

(51) Int. Cl.
*H01C 1/02* (2006.01)
*C09B 67/46* (2006.01)

(52) U.S. Cl. ..................................... 252/501.1; 264/436
(58) Field of Classification Search ............... 252/501.1; 264/436
See application file for complete search history.

(56) References Cited

U.S. PATENT DOCUMENTS

| 4,086,499 | A | * | 4/1978 | Mishra .......................... 307/400 |
| 5,989,629 | A | | 11/1999 | Sacripante et al. |
| 6,054,071 | A | * | 4/2000 | Mikkelsen, Jr. ............. 264/1.36 |
| 6,072,621 | A | * | 6/2000 | Kishi et al. .................... 359/296 |
| 2002/0131151 | A1 | | 9/2002 | Engler et al. |
| 2002/0186450 | A1 | * | 12/2002 | Foucher et al. ............... 359/296 |
| 2003/0016590 | A1 | | 1/2003 | Brewer et al. |
| 2011/0000786 | A1 | * | 1/2011 | Inoue et al. ................... 204/450 |

FOREIGN PATENT DOCUMENTS

| EP | 0 933 752 A2 | 8/1999 |
| EP | 1 262 817 A1 | 12/2002 |

* cited by examiner

Primary Examiner — Douglas McGinty
(74) Attorney, Agent, or Firm — Birch, Stewart, Kolasch & Birch, LLP

(57) ABSTRACT

An active element that is based on an electret emulsion and that comprises particles of pre-polarized electret material as emulsion in neutral liquid and both poles of the particles are colored with different colors. For producing a neutral carrier liquid for the active element liquid fluorine carbon is used. For producing electret material for the active element solid polymerised fluorine carbon or electret wax is used. The active element is used for producing visual matrix displays, indicators, surfaces and surface coatings that change color by the application of a control voltage.

12 Claims, 2 Drawing Sheets

ACTIVE OPTICAL ELEMENT, METHOD OF PRODUCING THE SAME

TECHNICAL FIELD

The present invention belongs to the field of active elements as surfaces and surface coatings that change colour by the application of a control voltage and to the field of electronic displays, more specifically to the field of elements as used in matrix displays and indicators.

STATE OF THE ART

Various elements are used to visualise images and information in different electronic displays that divide the displays into two main groups: active displays and passive displays.

In passive displays a control signal changes the reflection level of the matrix particles and using external light will form the visible image; the light will be reflected or absorbed according to the electrical field that is created between the control electrodes. The energy consumption of passive displays is lower and they are easier to read in conditions of intense external light. The main weaknesses of passive displays compared to active displays are: low contrast levels, low viewing angles and slow reaction times; the main strength of these displays is lower energy consumption. Passive displays are used for example in battery powered devices such as watches, calculators, and mobile telephones where power consumption is an issue.

In active displays the image is formed by each dot of the matrix emitting light with a different intensity. Each dot of the matrix is made of a light emitting diode that can be changed (switched) on or off by transistors made by film technology or other light emitting elements (plasma solution etc.) that speeds up changing (switching) the dots. These kind of displays need more source energy, the contrast of the image is better and has a wider angle of image visibility than passive displays. Active displays are used for example in larger portable and fixed mains powered devices where power consumption is not so much of an issue. The main weaknesses of active displays are that the light intensity is quite low and the image is not so visible in conditions of intensive external light (for example in direct sunlight); also their production cost and energy consumption is relatively high which limits their implementation possibilities.

Generally recognised are also so-called electromagnetic info tables (scoreboards) which rely on the polarization of an electrical pulse supplied to an electromagnet, where a plate (coloured light on one side and dark on the other side) turns its one or other side to the viewer. With using coils it is not possible to get dots very small and the mechanical inertness of the device is very high. This limits significantly the implementation areas of these kind of displays.

There are several different patents known from similar displays. Generally recognised is an electrostatic display described in U.S. Pat. No. 4,288,788 that is used to produce large numeric tables (scoreboards). To create the numbers big stripe like electrical elements are used. By using these elements number eight sign patterns can be composed. To visualise a number some elements are charged using a control voltage and the required stripes will turn their light or dark side to the viewer. In U.S. Pat. No. 4,163,162, also a numeric table (scoreboard), a method is described where the electromagnet is replaced by an electrostatic actuator. The main weaknesses of these solutions are that a high voltage is needed and their minimum physical size means that they are impossible to use in smaller high resolution displays.

In the international patent application WO03034140 there is described a display that is made of monomolecular monolayers where the optical transmission or reflection of the particles is dependent upon the applied electric field.

Most similar purpose to the purpose of the present invention is described in USA patent U.S. Pat. No. 6,054,071 for forming an electric paper display whereby images are created using small electret particles placed into the paper. The particles are polarized when an electric field is applied. Added powder colorant will cover a pole of the particle that has certain polarisation and the image will be formed in the paper. A weakness of this solution is that the particles are polarized and coloured inside the paper display, during the process of composing the image, that makes the realization of the solution very complicated. Although the result is similar to present invention, the principle is different. The present invention is different because it changes orientation of the pre-polarized and pre-coloured particles compared to the viewer.

SUMMARY OF THE INVENTION

The present invention relates to the construction of an active element where pre-polarised and, pre-coloured micro particles, suspended in an emulsion, are used to form an image by applying a control voltage which changes their orientation.

The objective of the invention is the creation of an active element that enables the construction of high contrast and low energy consumption matrix displays and surfaces with fast reaction times and high visibility.

The active element described in the present invention enables the production of displays and surfaces based on electret emulsions which have the following advantages:

Technological simplicity, high production volume and low production costs because there is no need to use precise and expensive light filters to produce a colour display;
High contrast level of the image;
Low energy consumption;
High image retention after the control voltage is turned off;
Good visibility of the image in conditions of intense external light; and
Long lifetime due to the intrinsic stability in time of the physical phenomena used.

Abovementioned characteristics enable use of the present invention in addition for different displays and indicators also for surfaces and surface coatings that can change colour if the control voltage is switched on and off.

The active element created from the present invention is based on an emulsion that contains floating micro particles that are pre-polarized and pre-coloured and have different coloured poles. The colour of display dot depends upon which pole is turned to the viewer. The particles are made of electret material and pre-polarised to change their orientation when an electric field is applied via a control voltage. If the polarisation of the electric field between control electrodes changes then the orientation of the particles will also change.

The present invention enables also to create colour displays by means of generally recognized methods (a colour image is formed by optical blending of an image of different primary colour elements).

BRIEF DESCRIPTION OF THE DRAWINGS

The invention is described using references to the drawings annexed where.

DETAILED DESCRIPTION OF THE INVENTION

Figure 1:
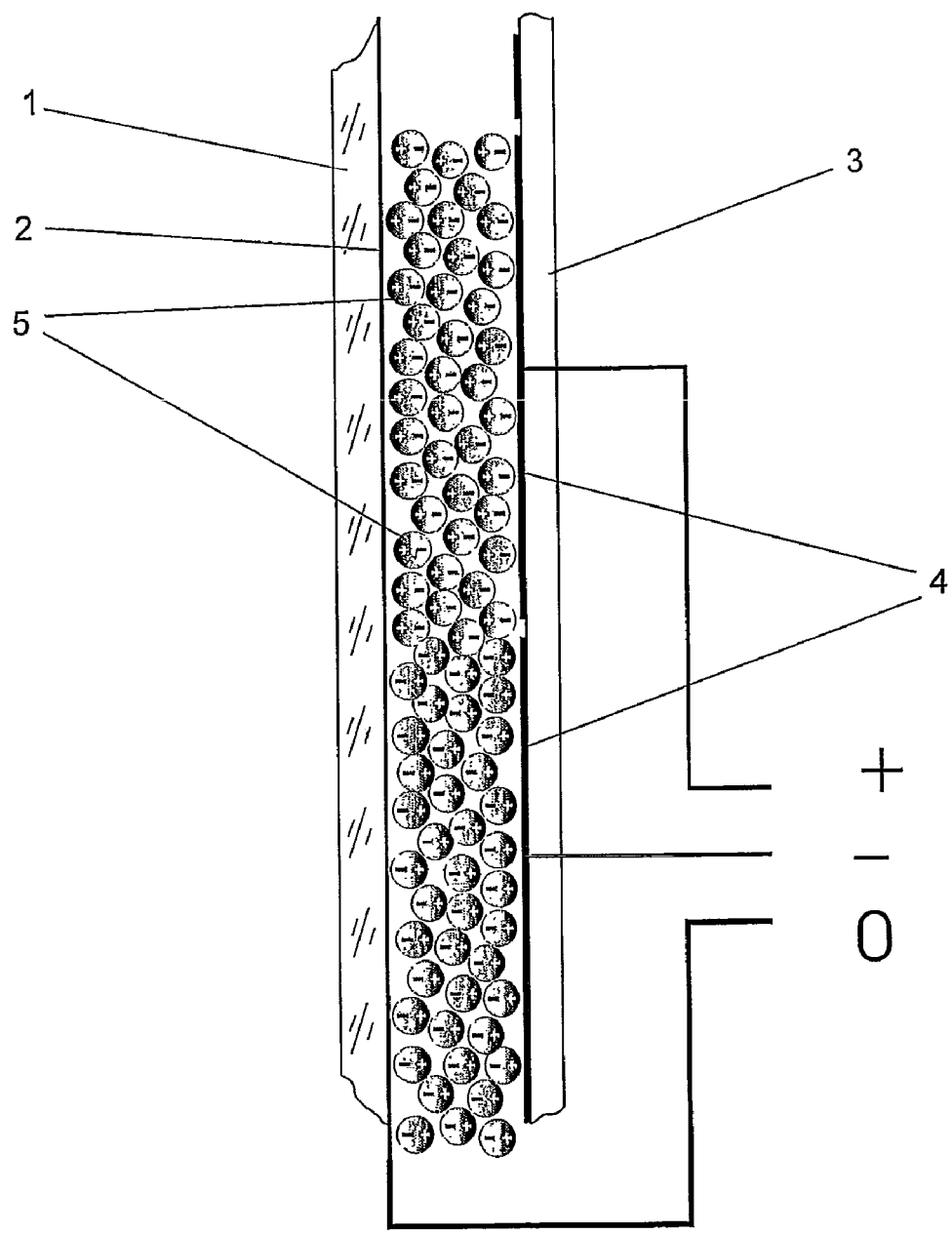
FIG. 1 is an illustration of side sectional view of the active element in a matrix display using one embodiment based on the present invention.
Figure 2:
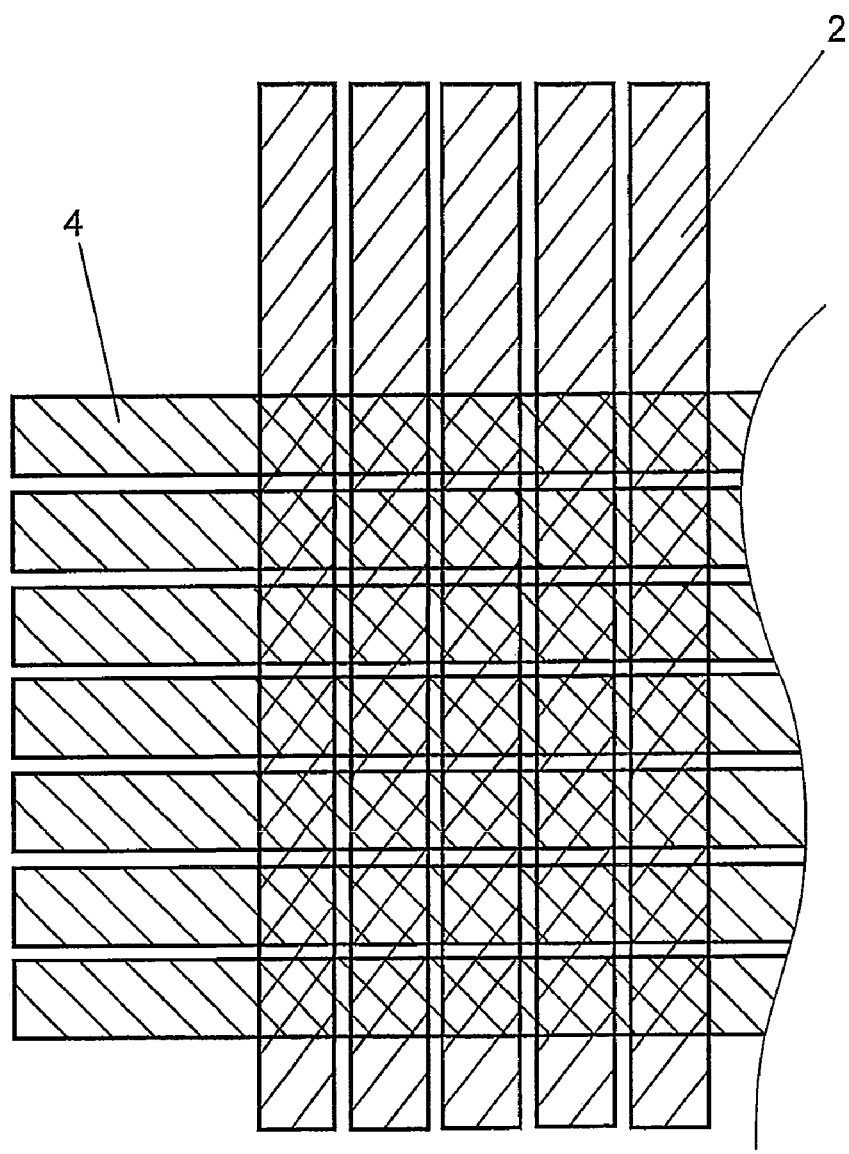
FIG. 2 is an illustration of front view of the matrix display illustrated in FIG. 1.

The present invention is explained by making use of the following embodiments. The practical aspects and usage possibilities of the invention are not limited by these embodiments. Embodiments 1 to 3 describe different methods of creating the active element. Embodiment 4 describes the usage of the active element.

Embodiment 1. Method 1 of Producing Active Element Based on Present Invention

For creating an active element based on the present invention a non-polymerized electret material (for example Teflon) is mixed with photochromal pigment (for example with pigment that will decolour/bleach in UV radiance). The resultant mixture is emulsified in a suitable non-blending same density neutral liquid, for example in fluorine-carbon. The mixture will be subjected to a controlled pressure and temperature, which will polymerize the particles in the electret liquid but not the environment. The resultant mixture is then subjected to a high electric field at high temperature and will be chilled in it (for example in a thin pipe where the mixture flows, that enables continuous and high volume production of the emulsion), so the particles will acquire an electric charge.

The electrically charged particles is then subjected to high UV radiance in a transparent pipe and a polarizing electricity field that causes their one pole to change colour.

In application the image will be retained after switching off the control voltage because of good insulating characteristics of the electret emulsion that makes it suitable for use in devices with very low energy consumption.

Creating the electret emulsion should be a continuous production process.

Embodiment 2. Method 2 of Producing Active Element Based on the Present Invention In this embodiment instead of polymerization of liquid monomer easily melting electrets are used (for example waxes) to get an active element. Electrets used will be emulsified in melted condition in carrier liquid (in neutral liquid, for example in fluorine carbon).

The emulsion created is subjected to a high electric field at high temperature and is chilled in it (for example in a thin pipe where the mixture flows) so the particles will acquire an electric charge.

The particles with electric charge are subjected to a high UV radiance in a transparent pipe and polarizing electricity field that causes their one pole to change colour.

Embodiment 3. Method 3 of Producing Active Element Based on the Present Invention This embodiment creates an electret material double layer film that has sides with different colours as an alternative way to get an active element. The film is heated in transverse high direct current electricity field and chilled in temperature where the material of the film will acquire stabile polarization crossways to the surface. One side of the resultant film will be with one polarization and the other has opposite polarization. The film will be cut into very small pieces; to create spherical particles the pieces are burnished in a ball mill or soft moulded; the pieces will be mixed to a liquid environment with same density using suitable emulsifiers if needed.

An active element that is created according to the methods in present invention is based on electret emulsion wherein it contains pre-polarised and pre-coloured micro particles of electret material in neutral liquid as emulsion and each electric pole of the particles used has a different colour.

Embodiment 4. Usage of the Active Element, Based on the Present Invention, in Matrix Displays of Electronics Equipment and Surfaces and Surface Coatings that Change Colour The active element based on the present invention can be used for example for producing matrix displays for use in electronic equipment (computers, TVs, mobile phones, indicators etc.), and surfaces and surface coatings that change colour. An active element that is based on an electret emulsion described above and that contains particles of pre-polarized electret material as emulsion in neutral liquid and both poles of the particles are coloured with different colours, is placed between two layers of a display or surface coating that is composed of a transparent outside plate (1), to which transparent control electrode (2) is laid on. From a small distance of it (compared to the dimensions of the display) is inside plate (3), to which other control electrodes (4) are laid on. The gap between control electrodes (2 and 4) is filled with electret emulsion that contains solid electret particles (5) that are suspended in a liquid with same density and are able to change their orientation to the viewer. The particles (5) are pre-polarised with direct current and each pole of the particles has a different colour.

Creating an image or changing a colour of a surface coating depends upon which side of an electret particle is turned to the viewer controlled by the polarity of voltage between the control electrodes. For creating an image the control voltage between control electrodes (2 and 4) is changed in a way that changing the polarisation will force the particles to turn one or other side to outside plate (1) that makes the corresponding dot of the matrix light or dark, or if coloured particles are used then one or another colour. A colour display is composed of stripes (or other shapes) that are composed of different colour particles.

The particles (5) used in the solution based on the present invention are very small (0.1-100 micrometers) that allows to visualize very sharp images by manipulating a low (under 100V) control voltage. The particles (5) are suspended in a neutral carrier with the same density that enables their quick and accurate control (rotation). The neutral carrier does not react with the control electrodes or materials used in particles (5). The neutral carrier is a very good insulator that enables the created image to be retained after the control voltage has been switched off (for example if fluorine carbons are used the charges will be retained for weeks). Because of this the energy consumption of the display is very low, energy is consumed only for the overcharging of the capacitor formed by the control electrodes).

Using the active element based on the present invention it is possible to produce matrix displays with a high resolution and low power consumption for electronics equipment The resolution of the display can be up to 1,000 dots per inch (and even higher in some cases) that depends upon which purpose the active element is used. To obtain higher resolution smaller particles should be used. Minimum measures of the particles (5) are determined by characteristics of used materials and can be measured in tenths of nanometres.

According to the purpose of the use of the active element and to achieve as high contrast level as possible, different photochromal pigment can be selected in each case. It can be black and white for production of a black and white display; it can be coloured with one primary colour for colour display; or coloured with two different colours for colour changing surfaces. It is possible to use two different bleaching pigments to colour each pole of the particle with different colour.

For getting multicoloured images in displays or surface coatings different stripes with main colours are used. By combining the stripes the colours demanded can be obtained based on optical blending.

The subject matter of the present invention is not limited with the examples given above, comprising electret materials that are used.

The invention claimed is:

1. A method of producing an electronic display, comprising:
   pre-polymerized electret material is mixed with photochromal pigment; and
   the resultant mixture is emulsified in a non-blendable, same density, neutral liquid; and
   subsequently the resultant mixture is subjected to sufficient pressure and temperature to polymerize the pre-polymerized electret material to form particles; and
   the resultant emulsion is subjected to an electric field of sufficient strength,
   then, the polymer is chilled in a thin pipe so the particles acquire an electric charge, and
   the particles with electric charge are subjected to sufficient ultra violet light radiation in a transparent pipe and a polarized electric field that causes their one pole to change color.

2. The method according to claim 1, wherein:
   the emulsion is formed by emulsifying electret material in molten condition in the neutral liquid; and
   the resultant emulsion is subjected to an electric field of sufficient strength,
   then, the polymer is chilled in a thin pipe so the particles acquire an electric charge, and
   the particles with electric charge are subjected to sufficient ultra violet light radiation in a transparent pipe and a polarized electric field that causes their one pole to change color.

3. The method according to claim 1, wherein:
   an electret material double layer film is produced that has sides with the different colors needed; and
   the film is heated in transverse high direct current electric field and chilled in temperature where the material of the film acquires stabile polarization crossways to the surface, wherein one side of the film has one polarization and the other has the opposite polarization; and
   the film is cut into very small pieces and shaped into spherical particles by burnishing in a ball mill or partially melting and shaping; and
   the resultant particles are mixed in a liquid environment with same density using suitable emulsifiers, if needed.

4. The method according to claim 1, wherein the neutral liquid is fluorine carbon.

5. The method according to claim 1, wherein the material of the electret particles is solid polymerized fluorine carbon.

6. The method according to claim 1, wherein the material of the electret particles is electret wax.

7. The method according to claim 2, wherein the neutral liquid is fluorine carbon.

8. The method according to claim 2, wherein the material of the electret particles is solid polymerized fluorine carbon.

9. The method according to claim 2, wherein the material of the electret particles is electret wax.

10. The method according to claim 3, wherein the neutral liquid is fluorine carbon.

11. The method according to claim 3, wherein the material of the electret particles is solid polymerized fluorine carbon.

12. The method according to claim 3, wherein the material of the electret particles is electret wax.

* * * * *